US012631587B1

(12) United States Patent
Al Ahmad et al.

(10) Patent No.: US 12,631,587 B1
(45) Date of Patent: May 19, 2026

(54) SYSTEMS AND METHODS FOR DETERMINING A PIEZOELECTRIC PROPERTY OF A PIEZOELECTRIC MATERIAL

(71) Applicant: United Arab Emirates University, Al Ain (AE)

(72) Inventors: Mahmoud F. Y Al Ahmad, Al Ain (AE); Omar Awayssa, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 19/299,659

(22) Filed: Aug. 14, 2025

(51) Int. Cl.
*G01N 27/22* (2006.01)

(52) U.S. Cl.
CPC ................................... *G01N 27/226* (2013.01)

(58) Field of Classification Search
CPC .................................................... G01N 27/226
USPC .............................. 324/500, 600, 76.11, 686
See application file for complete search history.

(56) References Cited

U.S. PATENT DOCUMENTS

| | | | |
|---|---|---|---|
| 7,034,744 B2 | 4/2006 | Zimmermann et al. | |
| 11,181,617 B2 | 11/2021 | Rittberg et al. | |
| 12,241,968 B2 | 3/2025 | Li et al. | |
| 2010/0088039 A1* | 4/2010 | Yang | G01N 33/582 |
| | | | 702/23 |
| 2011/0074515 A1* | 3/2011 | Yoshida | H03H 9/0519 |
| | | | 331/155 |
| 2013/0340859 A1* | 12/2013 | Downie | G01F 15/063 |
| | | | 137/486 |
| 2016/0246667 A1* | 8/2016 | Kumar Rao | G06F 11/0793 |
| 2020/0287126 A1* | 9/2020 | Chang | B06B 1/0688 |
| 2020/0403140 A1* | 12/2020 | Yeon | H10N 30/87 |
| 2021/0303814 A1* | 9/2021 | Liu | G06V 40/1347 |
| 2021/0343928 A1* | 11/2021 | Smits | H10N 30/045 |
| 2021/0384887 A1* | 12/2021 | Mortazawi | H03H 9/605 |
| 2022/0198106 A1* | 6/2022 | Montoya | G06Q 10/0631 |
| 2023/0344406 A1* | 10/2023 | Torazawa | H03H 9/25 |
| 2025/0268105 A1* | 8/2025 | Torrisi | H10N 30/20 |

OTHER PUBLICATIONS

Pan, Xi et al. "Low-Complexity Time-Domain Ranging Algorithm with FMCW Sensors." Sensors (Basel, Switzerland) vol. 19,14 3176. Jul. 19, 2019, doi:10.3390/s19143176.

* cited by examiner

*Primary Examiner* — Huy Q Phan
*Assistant Examiner* — Trung Q Nguyen
(74) *Attorney, Agent, or Firm* — Boyle Fredrickson S.C.

(57) ABSTRACT

A system and method for determining a piezoelectric property of a piezoelectric material are disclosed. The system includes a voltage source configured to apply a first voltage across the piezoelectric material during a first time period. A mass sensor is operatively coupled to the material to measure an apparent mass thereof, and a capacitance meter is configured to measure a capacitance of the material during the same time period. A processor, communicatively coupled to the mass sensor and the capacitance meter, is configured to calculate a first value indicative of a piezoelectric property, such as a piezoelectric coefficient (d33 or d31), based at least in part on the measured apparent mass and the measured capacitance. By utilizing these concurrent measurements, the system can determine an effective thickness of the material under an applied electric field, circumventing prior art assumptions and enabling a more direct and physically accurate characterization.

15 Claims, 3 Drawing Sheets

SYSTEMS AND METHODS FOR DETERMINING A PIEZOELECTRIC PROPERTY OF A PIEZOELECTRIC MATERIAL

TECHNICAL FIELD

The present disclosure relates generally to the field of material characterization. More specifically, the disclosure pertains to systems and methods for determining one or more piezoelectric properties of a piezoelectric material.

BACKGROUND OF THE INVENTION

The characterization of piezoelectric materials is fundamental to the design, manufacturing, and quality control of a vast array of electromechanical devices, including actuators, sensors, transducers, and energy harvesters. The piezoelectric coefficients, such as the longitudinal coefficient $d_{33}$ and the transverse coefficient $d_{31}$, are critical parameters that define a material's electromechanical coupling and performance.

Therefore, there exists for a technique that provides a direct and physically accurate determination of piezoelectric properties under operational electric fields, without reliance on the simplifying and potentially erroneous assumptions inherent in conventional methods.

SUMMARY OF INVENTION

The present invention seeks to obviate or at least mitigate the above-mentioned disadvantages of the prior art by providing a system and a method for determining a piezoelectric property of a piezoelectric material with improved accuracy and physical relevance.

According to a first aspect, there is provided a system for determining a piezoelectric property. The system comprises a voltage source configured to apply a first voltage across a piezoelectric material during a first time period. A mass sensor is operatively coupled to the piezoelectric material and is configured to measure an apparent mass thereof during the first time period. Furthermore, a capacitance meter is configured to measure a capacitance of the piezoelectric material during the same first time period. A processor, communicatively coupled to the mass sensor and the capacitance meter, is configured to calculate, based at least in part on the measured apparent mass and the measured capacitance, a first value indicative of a piezoelectric property of the material.

By utilizing the apparent mass and capacitance, the system circumvents the erroneous prior art assumption of a fixed, quiescent thickness or the assumption of a relationship between the piezoelectric coefficients $d_{33}$ and $d_{31}$. This enables a more precise calculation of the piezoelectric properties of the piezoelectric material.

According to a second aspect of the invention, there is provided a corresponding method for determining a piezoelectric property of a piezoelectric material. The method comprises the steps of applying a first voltage across the material during a first time period; measuring an apparent mass and a capacitance of the material during that first time period; and calculating, based at least in part on the measured apparent mass and capacitance, a first value indicative of a piezoelectric property.

In preferred embodiments, the processor is configured to calculate specific piezoelectric coefficients, such as $d_{33}$ and/or $d_{31}$, by utilizing predetermined relationships that link the measured apparent mass and capacitance to these coefficients, potentially in combination with other known parameters like material density and initial thickness. The system and method do not require any assumed relationship between different piezoelectric coefficients, allowing for their independent and unconstrained determination.

Further advantageous embodiments provide for a multi-stage measurement protocol, wherein measurements are taken at a bias voltage (e.g., zero volts) and subsequently at one or more non-zero voltages, for instance, with electric fields oriented both parallel and anti-parallel to the material's polarization direction. This protocol can enhance the robustness and accuracy of the characterization.

The disclosed system and method are not limited to laboratory characterization but are also amenable to various practical applications. For example, the invention may be embodied in a quality control system for selecting piezoelectric components on a production line based on their measured performance. In another embodiment, the invention may be integrated into a piezoelectric actuator for in-situ diagnostics, health monitoring, and performance calibration. In yet another embodiment, the system may function as a sensor, wherein an external environmental parameter is determined by measuring its effect on the material's piezoelectric property.

BRIEF DESCRIPTION OF DRAWINGS

The drawings illustrate various embodiments of the present invention. These embodiments are provided to exemplify different aspects and aid in understanding the invention. It should be understood that, while the invention has been illustrated and described in accordance with preferred embodiments, variations and modifications may be made without departing from the scope of the invention as defined by the claims.

DETAILED DESCRIPTION OF PREFERRED EMBODIMENTS

The present disclosure relates to determining piezoelectric properties of a piezoelectric material and as such the piezoelectric material must have a polarization. Meaning that, if the piezoelectric material for characterizing does not have an inherent and permanent polarization, such as an aluminum nitride film, the piezoelectric material for characterizing must have undergone a poling process to activate the piezoelectric properties of the material.

Figure 1:
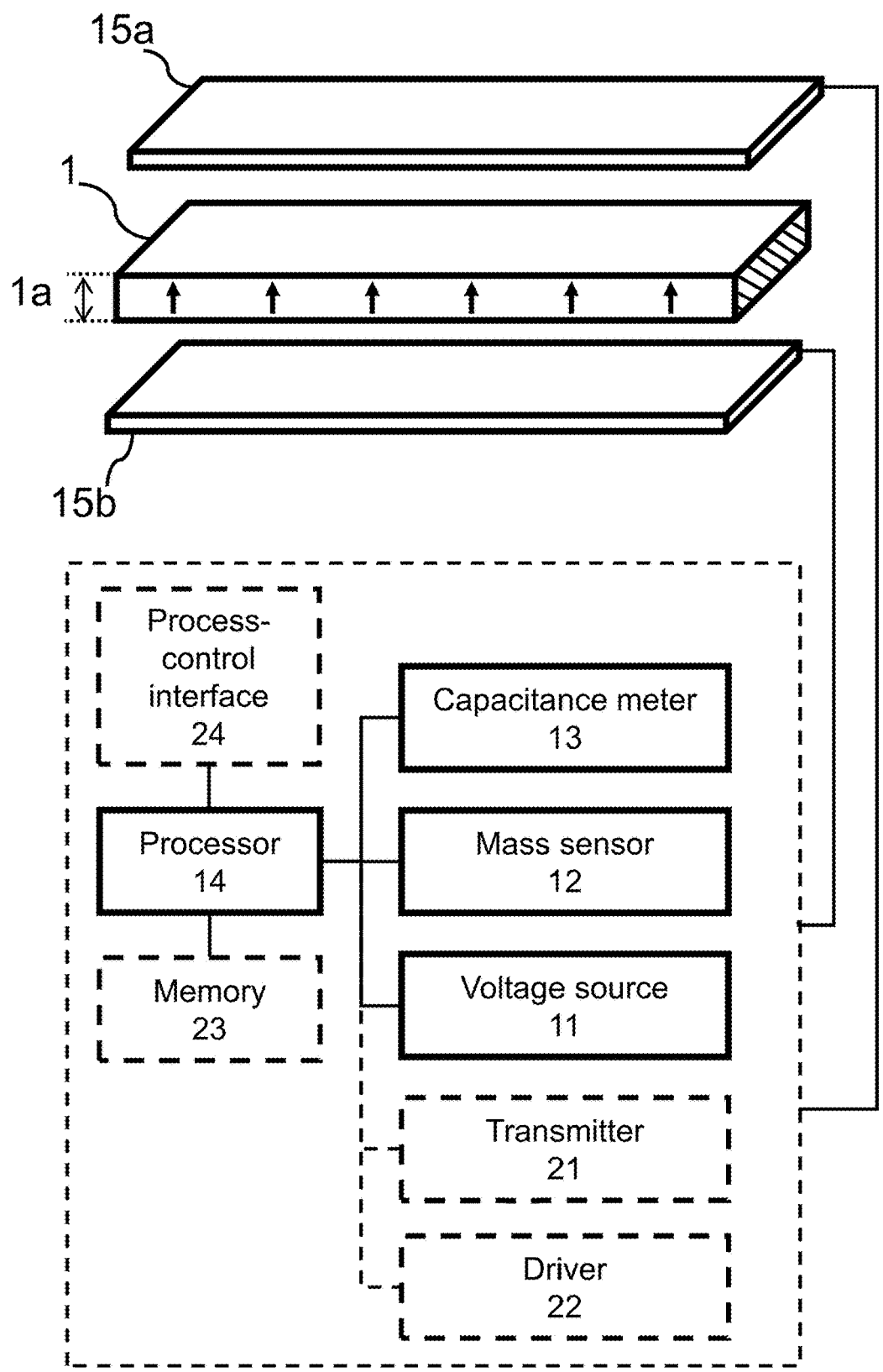
FIG. 1 is a schematic diagram illustrating an exemplary system for determining a piezoelectric property of a piezoelectric material in accordance with embodiments.

FIG. 1 is a schematic diagram illustrating an exemplary system for determining a piezoelectric property of a piezoelectric material 1. In the illustration of FIG. 1 the piezoelectric material 1 is disposed between a top electrode 15a and a bottom electrode 15b.

The piezoelectric material 1 may have thickness 1*b*, as indicated in the figure. The figure also indicates the direction of a polarization of piezoelectric material 1 by the vertical arrows within the material 1.

The system includes a voltage source 11, a mass sensor 12, a capacitance meter 13, and a processor 14. The voltage source 11 is electrically connected to the electrodes 15*a*, 15*b* and is configured to apply a voltage V across the piezoelectric material 1.

The application of the voltage V may generate an electric field E across the thickness T, 1*b* of the material. As illustrated, the polarization may be oriented from the bottom electrode 15*b* towards the top electrode 15*a*. The voltage source 11 may be controlled to apply a voltage such that the resulting electric field is oriented either substantially parallel or substantially anti-parallel to this direction of polarization.

The mass sensor 12 may be coupled to the piezoelectric material 1 and configured to measure an apparent mass, $m_v$, of the material. For instance, the assembly comprising the piezoelectric material 1 and the electrodes 15*a*, 15*b* may be placed on the mass sensor 12. Such a relationship may be referred to as operatively coupled because the piezoelectric material 1 may be placed on or otherwise positioned with respect to the mass sensor 12 in order to support measurements or other operations with the mass sensor 12. Coupling, such as operative coupling, may include physical coupling, such as touching, electrical coupling, such as supporting electromagnetic communication, thermal coupling, or the like. The capacitance meter 13 is configured to measure the electrical capacitance, $C_V$, of the piezoelectric material 1 across the electrodes 15*a*, 15*b*.

The processor 14 may be coupled to, such as in electronic communication with or physically connected to, the voltage source 11, the mass sensor 12, or the capacitance meter 13, or any combination thereof. The processor 14 may thus be understood to be communicatively coupled to voltage source 11, the mass sensor 12, and the capacitance meter 13. The processor 14 may be configured to control the voltage source 11 to apply one or more predetermined voltages.

The processor 14 is further configured to receive measurement data, including the apparent mass from the mass sensor 12 and the capacitance from the capacitance meter 13. Based on these measurements, and potentially other parameters such as the material's density ρ, initial thickness T, and relative permittivity $\varepsilon_{r_V}$, the processor 14 is configured to calculate a value indicative of a piezoelectric property of the material 1, such as the piezoelectric coefficients $d_{33}$ and/or $d_{31}$.

An advantage of the disclosed system and method is the circumvention of certain simplifying assumptions inherent to conventional characterization techniques, thereby providing a more direct and physically accurate determination of a material's properties.

In particular, other methods may rely on an initial, quiescent thickness of the piezoelectric material for subsequent calculations, such as determining the magnitude of the applied electric field. This approach fails to account for the physical change in thickness that occurs when a voltage is applied, leading to inaccuracies, particularly under high-field conditions or with highly responsive materials. The present invention overcomes this limitation. The processor 14 is configured to determine an effective thickness of the piezoelectric material 1 while the first voltage is being applied by utilizing a predetermined relationship between the measured apparent mass from the mass sensor 12 and the measured capacitance from the capacitance meter 13. This direct determination of the material's dimensional state under electrical load provides a more physically accurate basis for calculating the piezoelectric property.

Furthermore, the disclosed methodology may avoid reliance on an assumed relationship between different piezoelectric coefficients. Other analyses techniques may presume a fixed proportionality between, for example, the longitudinal and transverse piezoelectric coefficients in order to simplify calculations when one coefficient is unknown. The present disclosure, by contrast, may impose no such constraint, allowing for the independent and direct determination of multiple piezoelectric coefficients based on the measured parameters. This may provide a more complete and unconstrained characterization of the material's true anisotropic electromechanical response. The resulting first value may therefore be a more reliable indicator of the material's operational performance.

Some prior methods for determining these coefficients possess significant limitations. Resonance-based techniques, often performed with an impedance analyzer according to IEEE standards, derive piezoelectric properties from the material's electromechanical resonance frequencies. While such methods may be limited to specific sample geometries and frequency ranges, and the results may not accurately reflect the material's behavior under DC or quasi-static conditions, which are prevalent in many actuator applications.

Other prior methods include optical methods, such as laser interferometry, offer high-precision displacement measurements in response to an applied voltage, from which a piezoelectric coefficient can be calculated. However, these systems are often complex, expensive, and highly sensitive to environmental vibrations and thermal drift, making them more suitable for laboratory environments than for production or in-situ monitoring. Furthermore, they may measure displacement at a single point, which may not be representative of the bulk material's response, particularly in non-uniform or composite materials.

Additional prior methods include direct measurement techniques, such as those applying a known force to the material and measures the resulting surface charge provide a rapid measurement but may be restricted to a low, fixed frequency and a small applied force. Consequently, they measure the direct piezoelectric effect under conditions that may not be representative of the material's operational state, particularly when used in high-field actuator applications where the converse piezoelectric effect is dominant.

By directly determining properties under DC or quasi-static electric fields, the present invention is directly applicable to transducer contexts where resonance techniques may fail. The use of mass and capacitance measurements avoids the complexity, cost, and environmental sensitivity of optical systems, while providing a characterization of the bulk material response rather than a single point. Furthermore, by characterizing the converse piezoelectric effect under user-defined fields, the obtained values are more representative of a material's operational performance than those from low-force, direct-effect measurements. The present invention thus provides a more physically accurate, robust, and practically versatile characterization than is achievable with conventional methods.

In some embodiments the voltage source 11 is configured to provide bias voltage to the piezoelectric material 1 during an initial time period.

During this initial time period, the mass sensor 12 may be configured to measure an initial mass of the piezoelectric material 1. The processor 14 may then be configured to calculate the first value based further on this measured initial mass.

Alternatively, or additionally, during this initial time period, the capacitance meter 13 may configured to measure an initial capacitance of the piezoelectric material 1. The processor 14 may be configured to calculate the first value based further on the measured initial capacitance.

In an embodiment where the piezoelectric property to be determined includes the piezoelectric coefficient, $d_{33}$, the processor 14 is configured to calculate the first value by utilizing a predetermined relationship according to Equation 13, or an approximation thereof. This relationship utilizes a plurality of parameters, comprising: $m_r$, the measured apparent mass; $\rho$, a density of the piezoelectric material; $E_{rr}$, a relative permittivity of the piezoelectric material; V, a voltage of the first voltage; $C_r$, the measured capacitance; $\varepsilon_0$, the permittivity of free space; and T, the thickness 1b of the piezoelectric material 1.

In an embodiment where the piezoelectric property to be determined includes the piezoelectric coefficient, $d_{31}$, the processor 14 is configured to calculate a value for $d_{31}$. by utilizing a predetermined relationship according to Equation 9, or an approximation thereof. This relationship utilizes parameters comprising: $m_r$, the measured apparent mass; $\rho$, a density of the piezoelectric material; $E_{rr}$, a relative permittivity of the piezoelectric material; E, the magnitude of the electrical field generated by the applied first voltage V; $C_r$, the measured capacitance; $\varepsilon_0$, the permittivity of free space; and A, a area of the piezoelectric material as measured when there is no voltage applied.

In a further detailed embodiment, a multi-stage measurement protocol is employed. The voltage source 11 is configured to: apply a bias voltage during an initial time period; apply a first voltage during a first time period to generate an electric field oriented substantially parallel to the first direction; and apply a second voltage during a second time period to generate an electric field oriented substantially antiparallel to the first direction. Correspondingly, the mass sensor 12 and the capacitance meter 13 are configured to measure, respectively: an initial mass and an initial capacitance during the initial time period; a first apparent mass and a first capacitance during the first time period; and a second apparent mass and a second capacitance during the second time period. The processor 14 is configured to calculate the first value based at least in part on the measured initial mass, initial capacitance, first apparent mass, first capacitance, second apparent mass, and second capacitance.

The system described herein may be extended for use in various applications, such as in-situ diagnostics or environmental sensing, by incorporating additional optional components. As illustrated in FIG. 1, the system may further comprise a transmitter 21 and a driver 22, shown in dashed lines to indicate they are optional features. In the illustrated example, these components are communicatively coupled to the processor 14.

In one embodiment, the piezoelectric material 1 is part of a piezoelectric actuator. The system in this configuration further comprises a driver 22 configured to generate a drive signal to operate the piezoelectric actuator to perform a primary function, such as precise positioning or vibration generation. A transmitter 21 may also be included and may be communicatively coupled to the processor 14. The processor 14 may be configured to execute a diagnostic routine, for example, during idle periods of the actuator. The diagnostic routine comprises instructing the voltage source 11 to apply a first voltage, calculating the first value, and instructing the transmitter 21 to transmit a first signal indicative of the first value.

In a further aspect of the diagnostic embodiment, the processor 14 may be further configured to calibrate the drive signal, which is generated by the driver 22, based on the first value. This allows for the compensation of performance changes or degradation over the lifetime of the actuator.

In yet a further aspect, the processor 14 may be configured to instruct the transmitter 21 to transmit the first signal in response to determining that the first value exceeds a predetermined threshold. The threshold is indicative of a degradation level of the piezoelectric material 1. This enables condition-based maintenance alerts.

In another embodiment, the system itself functions as a sensor to measure an external environmental parameter. Here, the piezoelectric material 1 is configured for exposure to an external environment. Piezoelectric properties may be sensitive to environmental factors like temperature, humidity, or radiation. The piezoelectric material 1 may thus be configured for, such as positioned for or able to withstand, such environmental factors that may be present in an external (e.g., unprotected or unshielded) environment. The processor 14 may be configured to periodically determine the piezoelectric property by performing the mass and capacitance measurements as previously described. The processor may then determine a value for the external environmental parameter by correlating the calculated piezoelectric property with a known or pre-calibrated relationship. For example, a mathematical function mapping the $d_{33}$ coefficient to a value for the external environmental parameter may be stored in a memory 23 accessible by the processor. Finally, the processor instructs the transmitter 21 to transmit the determined value of the environmental parameter, allowing the system to serve as a remote environmental sensor.

In some arrangements, the piezoelectric material 1 may be part of a piezoelectric component. In such cases, the processor 14 may be further configured to compare a calculated first value, indicative of a piezoelectric property, to a criterion. The criterion is indicative of an operational performance level. In response to the first value meeting the criterion, the processor 14 is configured to generate an output signal for selecting the piezoelectric component for assembly into a piezoelectric device. This allows for automated quality control and sorting of components based on their measured performance characteristics.

The system may further comprise a process-control interface 24 communicatively coupled to the processor 14. The processor 14 may be configured to transmit a control signal via the process-control interface 24 to initiate a process for modifying the piezoelectric property of the piezoelectric material 1. This action may be performed in response to the first value not meeting the aforementioned criterion, providing a feedback mechanism for material conditioning or process adjustment.

In certain embodiments, the system may further comprise a memory 23 storing a regression model. The processor 14 may be configured to determine the criterion or the threshold from the regression model. The regression model maps a set of known apparent mass values to a property indicative of at least one of a degradation level or an operational performance level. The memory 23 may be any suitable type of computer-readable storage medium.

The embodiments described herein may utilize a mass sensor 12 and a capacitance meter 13 to perform measurements. The selection of specific instrumentation may depend on factors such as the required precision, the operational environment, and the physical characteristics of the piezoelectric material 1 under test.

The mass sensor 12 functions to measure an apparent mass of the piezoelectric material 1. This function may be realized by a variety of physical structures. In some embodiments, the mass sensor 12 is a direct-weighing instrument such as a microbalance or a nano-gram scale. Alternatively, the mass sensor 12 may be embodied as a force transducer configured to measure the weight of the material assembly, from which mass is determined. Examples of such force transducers include, but are not limited to, a load cell, a strain gauge-based sensor, or a piezoresistive force sensor. In such configurations, the processor 14 is configured to receive a signal indicative of the measured force and convert it to a mass value, for instance by dividing by the acceleration due to gravity, g.

In other embodiments, the mass sensor 12 may be configured as a resonant system. In such systems, a change in the apparent mass of the piezoelectric material 1 induces a measurable shift in a resonant frequency. For example, the mass sensor 12 may be a Quartz Crystal Microbalance (QCM), where the piezoelectric material 1 is disposed upon the crystal surface.

The capacitance meter 13 is configured to measure the electrical capacitance of the piezoelectric material 1 across the electrodes 15a, 15b. In various embodiments, the capacitance meter 13 may be a standard laboratory instrument, such as an LCR meter, an impedance analyzer, or a vector network analyzer (VNA). Such instruments may be capable of characterizing the dielectric properties of the material and can measure capacitance as a function of frequency and any applied DC bias voltage from the voltage source 11.

Alternatively, the capacitance meter 13 may be embodied as a dedicated measurement circuit integrated into the system. For example, the capacitance meter 13 can be a circuit configured to determine capacitance by measuring the RC time constant. Such a circuit would include a resistor of known value placed in series with the piezoelectric material 1, with the processor 14 controlling a switch to apply a step voltage and subsequently timing the charging or discharging curve. In another embodiment, the capacitance meter 13 is an oscillator circuit, for example an LC or RC oscillator, wherein the piezoelectric material 1 functions as the capacitive element. The oscillation frequency, which is dependent on the capacitance, is measured by a frequency counter, and the processor 14 calculates the capacitance from this frequency.

Further embodiments of the capacitance meter 13 include a bridge circuit, such as a Schering or Wien bridge, which is balanced to find the unknown capacitance. The capacitance meter 13 may also be configured to operate by charge integration. In such a configuration, a known voltage from the voltage source 11 is applied to the piezoelectric material 1, and a charge amplifier or integrator circuit measures the total stored charge, Q.

Figure 2:
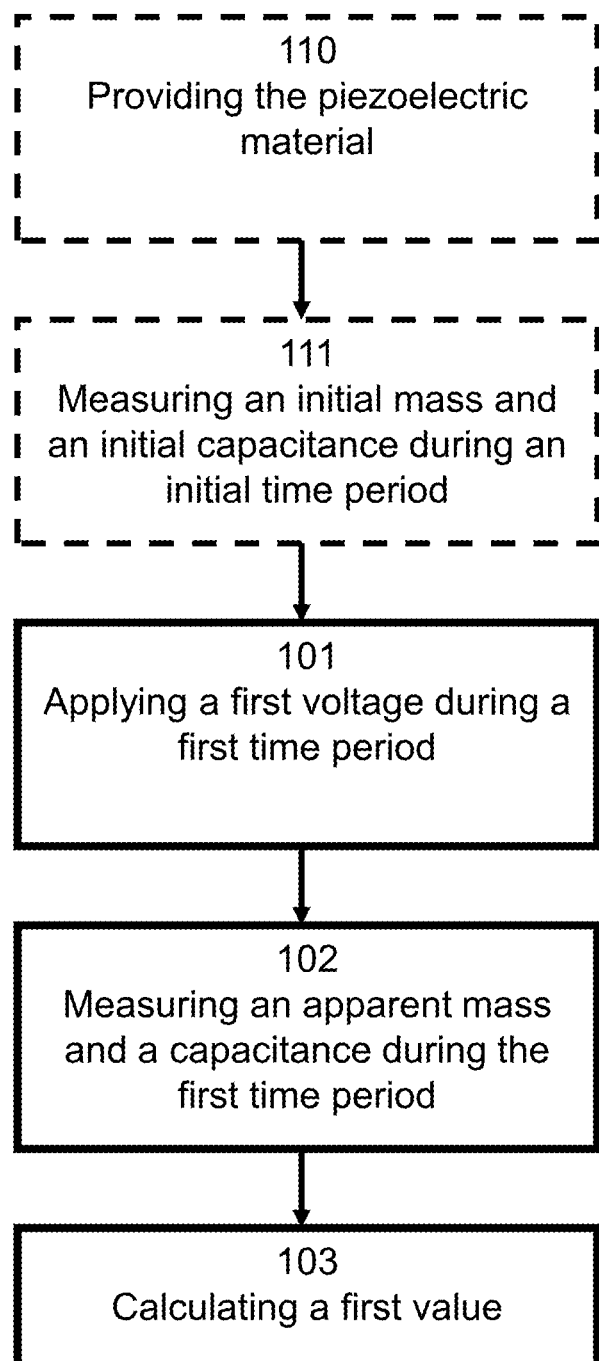
FIG. 2 is a flowchart illustrating an exemplary method for determining a piezoelectric property of a piezoelectric material in accordance with embodiments.

FIG. 2 illustrates a flowchart of an exemplary method for determining a piezoelectric property of a piezoelectric material. The method may optionally commence at step 110 by providing the piezoelectric material. The material is one having or being capable of having a polarization. Step 110 and 111 are shown in dashed lines to indicate they are optional features.

In some embodiments, the method may proceed to optional step 111, wherein an initial mass and/or an initial capacitance of the piezoelectric material are measured during an initial time period. This initial time period is characterized by a bias voltage being applied across the material. These initial values may serve as a baseline for subsequent calculations.

At step 101, a first voltage is applied across the piezoelectric material during a first time period. The application of this voltage induces a dimensional change in the material due to the piezoelectric effect.

Preferably, the first voltage is applied across electrodes positioned on the piezoelectric material to generate an electric field oriented substantially parallel or anti-parallel to the first direction.

Subsequently, at step 102, an apparent mass and a capacitance of the piezoelectric material are measured during the first time period, i.e., while the first voltage is being applied. The term "apparent mass" refers to the mass of the material as it changes in response to the applied voltage.

Finally, at step 103, a first value is calculated. This first value is indicative of a piezoelectric property of the material and is calculated based at least in part on the apparent mass and capacitance measured in step 102. The calculation may further be based on the initial mass and initial capacitance measured in step 111, as well as other known parameters of the material such as its density (p), thickness (T), and relative permittivity ($\varepsilon_{rV}$).

Figures 2A, 2B:
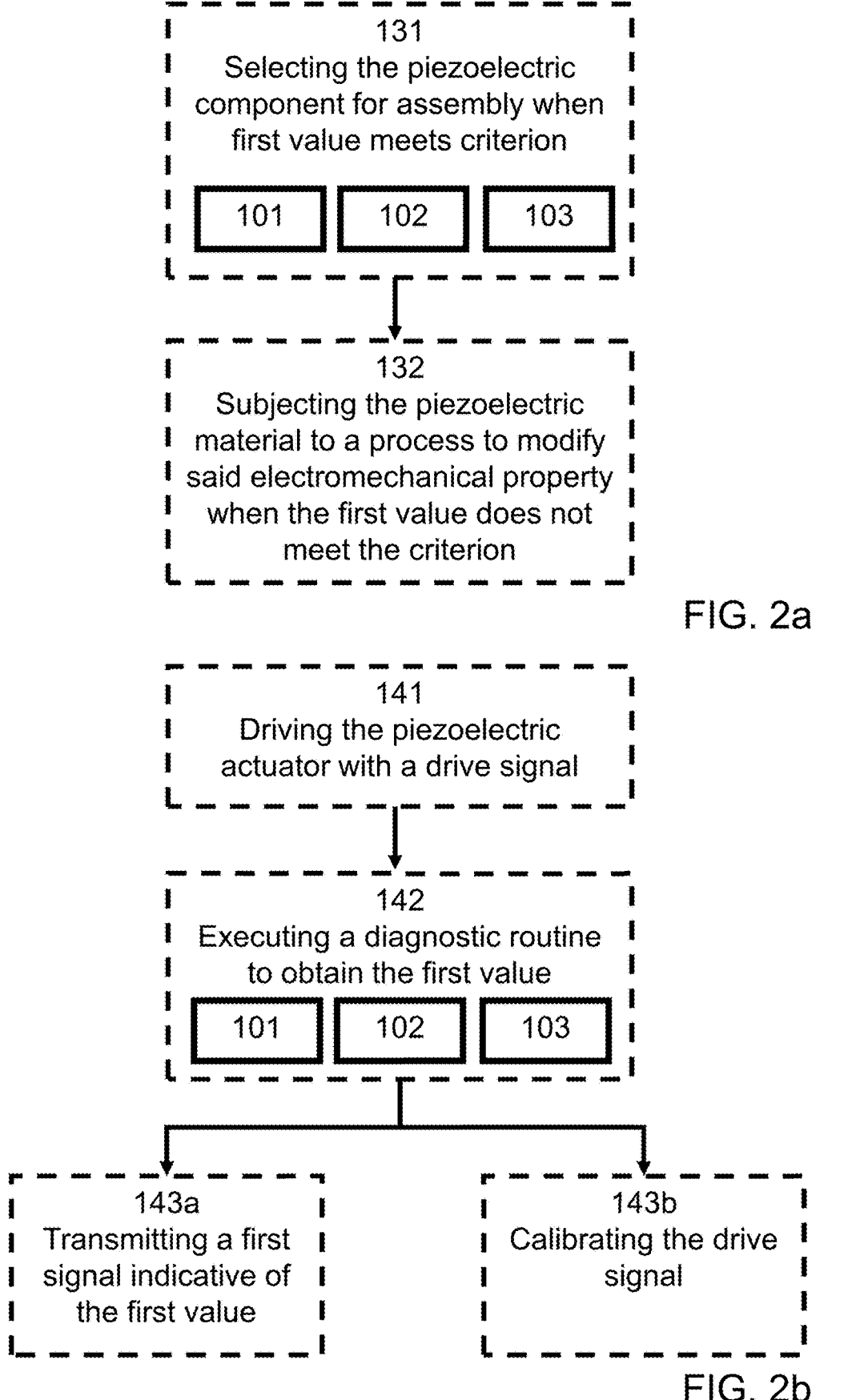
FIG. 2a is a flowchart illustrating a method for the quality control of a piezoelectric component, representing a particular application of the method of FIG. 2.
FIG. 2b is a flowchart illustrating a method for the in-situ diagnostics and calibration of a piezoelectric actuator, representing another particular application of the method of FIG. 2.

FIG. 2a illustrates a flowchart of a method for quality control of a piezoelectric component, representing one possible application of the disclosed method. This method is particularly useful in a manufacturing or production line setting. Subsequent to the calculation of the first value indicative of a piezoelectric property (see FIG. 2, step 103), the method proceeds to a decision-making stage based on this value. The first value is compared to a predetermined criterion, which is indicative of an operational performance level required for a specific application.

At step 131, if the calculated first value meets the criterion, the piezoelectric component is selected for assembly into a piezoelectric device. This ensures that only components with satisfactory piezoelectric performance are used in final products.

Conversely, at step 132, if the first value does not meet the criterion, the piezoelectric component may be subjected to a process intended to modify said electromechanical property. For example, the component could undergo a further poling process to improve its piezoelectric response. Following such a process, the component may be re-tested according to the method of FIG. 2 to re-evaluate its properties.

FIG. 2b illustrates a flowchart of a method for in-situ diagnostics and calibration of a piezoelectric actuator, which constitutes another possible application of the disclosed method. This method allows for the monitoring and adjustment of an actuator's performance during its operational life.

The method may begin at step 141, wherein the piezoelectric actuator is driven with a drive signal to perform its primary function, such as positioning an element or ejecting a fluid.

At step 142, a diagnostic routine is executed. This routine comprises the steps of applying a first voltage and obtaining the first value, as detailed in the method of FIG. 2. This provides a current characterization of the actuator's piezoelectric property, which may change over time due to factors such as aging, temperature fluctuations, or exposure to radiation.

Following the diagnostic routine, one or more actions may be taken. At step 143a, a first signal indicative of the obtained first value may be transmitted. This signal can be sent to a central monitoring system or a user interface, providing an alert or status update on the health of the actuator. The transmission may be configured to occur only in response to the first value exceeding a predetermined threshold, said threshold being indicative of a certain degradation level of the piezoelectric material.

Alternatively, or additionally, at step 143b, the drive signal used to operate the actuator is calibrated based on the obtained first value. This calibration compensates for any detected change in the piezoelectric property, thereby ensuring that the actuator continues to perform its primary function accurately and reliably.

In certain embodiments, the criterion used for selection in step 131 or the threshold used for transmission in step 143a may be determined based on a regression model. Such a model may be configured to map a set of known measurement values (e.g., effective mass, capacitance) to a material property that is indicative of a degradation level and/or an operational performance level. This allows for a data-driven approach to quality control and health monitoring.

In some embodiments, the piezoelectric property determined in the calculation step 103 includes a piezoelectric coefficient, $d_{33}$. The calculation 103 may utilize the relationship of Equation 13 or an approximation thereof. In this scenario the calculation 103 may be further based on: $m_V$, which is the measured apparent mass; $\rho$, which is a density of the piezoelectric material; $\varepsilon_{rV}$, which is a relative permittivity of the piezoelectric material; V, which is the magnitude of the first voltage; $C_V$, which is the measured capacitance; $\varepsilon_0$, which is the permittivity of free space; and T, which is a thickness of the piezoelectric material.

In other embodiments, the piezoelectric property includes a piezoelectric coefficient, $d_{31}$. The calculation 103 may utilize the relationship of Equation 9 or an approximation thereof. In this scenario the calculation 103 may be further based on: $m_V$, which is the measured apparent mass; $m_0$, which is a initial mass of the piezoelectric material when there is no voltage applied, $\rho$, which is a density of the piezoelectric material; $\varepsilon_{rV}$, which is a relative permittivity of the piezoelectric material; E, the magnitude of the electrical field generated by the applied first voltage V; $C_V$, the measured capacitance; $\varepsilon_0$, the permittivity of free space; and A, a area of the piezoelectric material as measured when there is no voltage applied.

In a particular embodiment, measuring the apparent mass of the piezoelectric material comprises a more detailed sequence. This sequence may include measuring 111, during an initial time period where there is a bias voltage applied to the piezoelectric material, an initial mass and an initial capacitance of the piezoelectric material.

The sequence further comprises applying 101 a first voltage across the piezoelectric material during a first time period, wherein the first voltage is applied across electrodes positioned on the piezoelectric material to generate an electric field oriented substantially parallel to the first direction. During this first time period, a first apparent mass and a first capacitance of the piezoelectric material are measured 102.

A second voltage is then applied across the piezoelectric material during a second time period. This second voltage is applied across the electrodes to generate an electric field oriented substantially anti-parallel to the first direction. During this second time period, a second apparent mass and a second capacitance are measured.

For this sequence, the calculation 103 may further be based at least in part on the measured initial mass, initial capacitance, first apparent mass, first capacitance, second apparent mass, and second capacitance.

This more detailed sequence, which utilizes two opposing field directions, can serve to improve the robustness and accuracy of the characterization by mitigating potential measurement drifts or biases. In one variation of this more detailed sequence, the steps involving the initial time period may be omitted.

It is to be understood that the method, examples of which is depicted in FIGS. 2, 2a and 2b, may be implemented by a system such as that exemplified in FIG. 1. Likewise, the system of FIG. 1 may be configured to perform the steps of the method illustrated in FIG. 2.

For instance, the voltage source 11 may perform the step of applying a voltage 101. The mass sensor 12 and the capacitance meter 13 may perform the step of measuring the apparent mass and capacitance 102. The processor 14 may be configured to receive the measured values and may perform the step of calculating the first value 103. The processor 14 may further be configured to control the system components to execute the optional steps 110, 111.

The present disclosure, in particular the system of FIG. 1 and the method of FIG. 2, utilizes a defined voltage protocol for the characterization of the piezoelectric material 1. In embodiments, this protocol may involve the sequential application of a bias voltage, a first voltage, and a second voltage. The voltage source 11, under the control of the processor 14, is configured to apply these voltages across the electrodes 15a, 15b.

The first voltage and the second voltage may be distinct, non-zero probing voltages. They are preferably direct current (DC) voltages, each having a predetermined, substantially constant magnitude during its respective time period of application. Their purpose is to induce distinct and measurable electromechanical states in the piezoelectric material 1. In a preferred embodiment, the first voltage and second voltage have substantially equal magnitudes but opposite polarities (e.g., $+V_{app}$ and $-V_{app}$). This configuration may generate electric fields that are, respectively, substantially parallel and substantially anti-parallel to the polarization of the material 1, thereby enabling a robust and symmetric probing of the piezoelectric response.

The bias voltage may be applied during the initial time period to establish a stable, reference electrical state. During the application of this bias voltage, the initial mass and initial capacitance may be measured. Importantly, the bias voltage may be zero volts, which may be achieved by, for example, short-circuiting the electrodes 15a, 15b. Alternatively, the bias voltage may be a specific non-zero DC voltage used to establish a particular quiescent operating point for the piezoelectric material 1 before the probing voltages are applied.

In embodiments, the measurement sequence may involve establishing a baseline at the predetermined bias voltage, then transitioning to the first voltage for a first set of measurements, and subsequently transitioning to the second voltage for a second set of measurements. This structured protocol ensures that the changes in apparent mass and capacitance are measured relative to a consistently defined electrical reference state.

The following section provides a exemplary framework underpinning the disclosed methodology and/or employed by the system described with reference to FIG. 1. The derivation is based on the principle that an applied voltage, V, induces dimensional changes in a piezoelectric material 1 due to the piezoelectric effect. These dimensional changes result in a quantifiable variation in both the apparent mass, $m_V$, and the electrical capacitance, $C_V$, of the material 1. By establishing the relationships between these measured parameters and the material's 1 intrinsic properties it becomes possible to solve for the piezoelectric coefficients. The derivation commences from the fundamental properties of the material 1 in a quiescent state, that is, under a zero applied voltage.

The mass at zero applied bias ($m_0$) may be determined by the material's 1 area (A), thickness (T), and density ($\rho$), according to Equation (1):

$$m_0 = \rho T A \tag{1}$$

When a voltage is applied to the material 1, its dimensions change due to the piezoelectric effect. When the applied voltage is anti-parallel to the direction of polarization, the resulting mass, $m_{va}$, is given by Equation (2a). Conversely, when the voltage is applied parallel to the direction of polarization, the resulting mass, $m_{vp}$, is given by Equation (2b):

$$m_{va} = \rho(A + \Delta A)(T - \Delta T) \tag{2a}$$

$$m_{vp} = \rho(A - \Delta A)(T + \Delta T) \tag{2b}$$

Accordingly, Equations (2a) and (2b) may be consolidated into a single generalized expression for the resulting mass. This generalized formulation accounts for the inverse relationship between the change in the cross-sectional area, and the change in the thickness, wherein the selection of the upper or lower mathematical operators is dependent on whether the applied voltage is anti-parallel or parallel, respectively, to the direction of polarization:

$$m_V = \rho(A \pm \Delta A)(T \mp \Delta T) \tag{2}$$

The thickness T is defined as the length of the material 1 in the same direction as the direction of the polarization. If the thickness T is not uniform across area A, the equations are preferably adapted to account for the resulting non-uniform electrical field using methods known in the art. As the skilled person understands, the Equations (2), (2a), (2b) holds true independently of ratio between the area A and thickness T.

The changes in area, $\Delta A$, and thickness, $\Delta T$, are dependent on the applied electric field E and the piezoelectric coefficients, as expressed in Equations (3a) and (3b):

$$\pm \Delta A = A\left[\pm 2d_{31}E + d_{31}^2 E^2\right] \tag{3a}$$

$$\pm \Delta T = \pm d_{33}V \tag{3b}$$

wherein
  E is the applied electric field, given by E=V/T
  $d_{33}$ is the longitudinal piezoelectric coefficient
  $d_{31}$ is the transverse piezoelectric coefficient
  the "±" in Equation 3a and 3b accounts for expansion or contraction depending on the polarity of the applied electric field relative to the poling direction.

In an embodiment, the electrical capacitance as a function of the applied voltage V, $C_V$, may be expressed according to Equation (4):

$$C_V = \frac{\varepsilon_0 \varepsilon_{rV} A_V}{T_V} \tag{4}$$

The apparent mass as a function of applied voltage, $m_V$, may be expressed according to Equation (5):

$$m_V = \rho A_V T_V \tag{5}$$

Wherein:

$\varepsilon_0$ is the permittivity of free space;

$\varepsilon_{rV}$ is the voltage-dependent relative permittivity of the piezoelectric material 1;

$A_V$ is the effective area under the applied voltage;

$T_V$ is the effective thickness under the applied voltage; and, $\rho$ is the mass density of the material.

It should be noted that the relative permittivity $E_{rV}$ referred to in this disclosure refers to the relative permittivity of the piezoelectric material 1 prior to any poling process.

The following Equations (6) to (9) provides one example on how to extract the transverse piezoelectric coefficient $d_{31}$.

To establish a relationship between mass, $m_V$, and capacitance, $C_V$, Equation (5) may be multiplied by Equation (4), which yields Equation (6):

$$C_V m_V = \frac{\varepsilon_0 \varepsilon_{rV} A_V}{T_V} \rho A_V T_V = \varepsilon_0 \varepsilon_{rV} \rho A_V^2 \tag{6}$$

Rearranging Equation (6) to solve for the effective area $A_V$ yields Equation (7):

$$A_V = \sqrt{\frac{C_V m_V}{\varepsilon_0 \varepsilon_{rV} \rho}} \tag{7}$$

The effective area $A_V$ can also be expressed in terms of the piezoelectric coefficient $d_{31}$ as shown in Equation (8):

$$A_V = A \pm \Delta A = A\left[1 \pm 2d_{31}E + d_{31}^2 E^2\right] \tag{8}$$

By substituting the expression for $A_V$ from Equation (8) into Equation (7), the resulting expression can be rearranged to solve for the coefficient $d_{33}$, yielding Equation (9):

$$d_{31} = \frac{1}{E}\left[\mp 1 \pm \sqrt{\sqrt{\frac{C_V m_V}{\varepsilon_0 \varepsilon_{rV} \rho A^2}}}\right] \tag{9}$$

The following Equations (10) to (13) provides one example on how to extract the longitudinal piezoelectric coefficient $d_{33}$.

To establish a relationship between mass, $m_V$, and capacitance, $C_V$, Equation (5) may be divided by Equation (4), which yields Equation (10):

$$\frac{m_V}{C_V} = \frac{\rho A_V T_V}{\varepsilon_0 \varepsilon_{rV} A_V} = \frac{\rho T_V^2}{\varepsilon_0 \varepsilon_{rV}} \qquad (10)$$

Rearranging Equation (10) to solve for the effective thickness $T_V$ yields Equation (11):

$$T_V = \sqrt{\frac{\varepsilon_0 \varepsilon_{rV}}{\rho} \frac{m_V}{C_V}} \qquad (11)$$

The effective thickness $T_V$ can also be expressed in terms of the piezoelectric coefficient $d_{33}$ as shown in Equation (12):

$$T_V = T \pm d_{33} V \qquad (12)$$

By substituting the expression for $T_V$ from Equation (12) into Equation (11), the resulting expression can be rearranged to solve for the coefficient $d_{33}$, yielding Equation (13):

$$d_{33} = \frac{\pm \left[ \sqrt{\frac{\varepsilon_0 \varepsilon_{rV} m_V}{\rho C_V}} - T \right]}{V} \qquad (13)$$

The measurement 102 of the apparent mass and the capacitance by the processor 14 could be performed by processing time-domain signals. These signals may be received from the mass sensor 12 and the capacitance meter 13, respectively. This processing could be synchronized with the voltage application protocol, which may also be controlled by the processor 14.

The mass sensor 12 may provide a signal that could be a function of the instantaneous force exerted by the piezoelectric material 1. This signal could be sampled by an analog-to-digital converter to yield a discrete-time signal sequence. This sampling process may be time-gated by the processor 14 to coincide with an interval where a specific voltage is applied and could be considered stable.

The processor 14 could be configured to execute a digital signal processing algorithm to estimate the apparent mass from a relevant window of the sampled data. In some embodiments, where a quasi-static mass value might be sought, the algorithm could involve applying a digital low-pass filter to the data sequence. This could serve to attenuate measurement noise and other high-frequency disturbances. A steady-state value could then be estimated by computing a statistical measure, such as an average, over the filtered sample window. The estimated signal value could then be converted to an apparent mass value using a predetermined calibration function, which might map the digital signal representation to a physical mass unit.

For instance, where the mass sensor 12 is a resonant system, the signal could represent an oscillation frequency. The processor 14 might then implement a frequency estimation algorithm to determine the resonant frequency with high precision. The calibration function could in this case embody a known relationship between frequency shift and mass change.

Similarly, the capacitance meter 13 may provide a signal from which the processor 14 could determine a capacitance value. The processor 14 may acquire a discrete-time representation of this signal, which could be synchronized with the application of the voltage. The specific signal processing algorithm employed by the processor 14 could depend on the particular type of capacitance meter 13 being used.

In an embodiment where the capacitance meter 13 is an oscillator circuit, the output could be a periodic waveform whose frequency might be a function of the material's 1 capacitance. The processor 14 may be configured to perform a frequency estimation on the sampled signal, for example, by analyzing the signal's spectral density to identify its fundamental frequency. The capacitance value could then be calculated from this estimated frequency using a known transfer function of the oscillator.

In another embodiment where the capacitance meter 13 operates by measuring a time constant, the processor 14 could initiate a voltage step and capture the resulting transient response signal. The sampled response could then be processed using a parameter estimation algorithm. For example, the processor 14 might perform a curve-fitting operation on the data to extract a time constant value. From this time constant, the capacitance value could be determined.

The term polarization, as used herein, refers to the net permanent or quasi-permanent electric dipole moment per unit volume within the piezoelectric material 1. This polarization establishes a macroscopic polar axis, which is depicted in FIG. 1 as a first direction indicated by the vertical arrows. This polarization may be inherent to the material's crystal structure or induced through a poling process, wherein the material is subjected to a strong electric field to align its internal electric dipoles.

For the purposes of this disclosure, an electric field E is considered parallel to the polarization when the electric field vector is oriented predominantly in the same direction as the polarization vector. Similarly, an electric field E is considered anti-parallel to the polarization when the electric field vector is oriented predominantly in the opposite direction of the polarization vector. These definitions are intended to encompass the practical, non-ideal alignments that occur in physical systems, including minor misalignments or variations due to effects such as field fringing. Accordingly, the terms "parallel" and "anti-parallel" are used throughout this specification to denote these functional, rather than strictly geometric, relationships.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the Figures, such as FIGS. 1, 2, 2a, 2b, comprise some features, circuitries, or operations which are illustrated with a solid line and some features, circuitries, or operations which are illustrated with a dashed line. Features, circuitries, or operations which are comprised in a solid line are features, circuitries, or operations which are comprised in at least one of the broadest example embodiments. Features, circuitries, or operations which are comprised in a dashed line are example embodiments which may be comprised in, or a part of, or are further features, circuitries, or operations which may be taken in addition to the solid line example embodiments. It should be appreciated that these operations need not be performed in order presented. Furthermore, it should be appreciated that not all of the operations need to be performed. The example operations may be performed in any order and in any combination. Further, the claims may not recite all features or combinations disclosed herein. This disclosure, taken as a whole, describes examples and embodiments that may not be claimed herein but to which the applicant is entitled, and which may be the subject of related applications.

It is to be noted that the word "comprising" does not necessarily exclude the presence of other elements or steps than those listed.

It is to be noted that the words "a" or "an" preceding an element do not exclude the presence of a plurality of such elements.

It is to be noted that a list in the form of "at least one of A, B, or C, or any combination thereof" should be understood to mean "A", or "B", or "C", or "A and B", or "A and C", or "B and C", or "A and B and C".

It is to be noted that the term "indicative of" may be seen as "associated with", "related to", "descriptive of", "characterizing", and/or "defining". The terms "indicative of", "associated with", "related to", "descriptive of", "characterizing", and "defining" can be used interchangeably. The term "indicative of" can be seen as indicating a relation. For example, weight data indicative of weight may comprise one or more weight parameters.

It is to be noted that the word "based on" may be seen as "as a function of" and/or "derived from". The terms "based on" and "as a function of" can be used interchangeably. For example, a parameter determined "based on" a data set can be seen as a parameter determined "as a function of" the data set. A parameter or action may be determined or performed "based on" multiple inputs, items, or predicates. For example, a parameter or action may be "based at least in part on" a first input and "based at least in part on" a second input, which may or may not be expressly recited or claimed. In other words, the parameter may be an output of one or more functions with multiple inputs, including the data set as an input.

A function may be characterizing a relation between an input and an output, such as mathematical relation, a database relation, a hardware relation, logical relation, and/or other suitable relations.

It should further be noted that any reference signs do not limit the scope of the claims, that the example embodiments may be implemented at least in part by means of both hardware and software, and that several "means", "units" or "devices" may be represented by the same item of hardware.

The various example methods and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A system comprising:
   a voltage source configured to apply a first voltage across a piezoelectric material during a first time period, wherein the first voltage comprises a voltage waveform having a direct-current (DC) component during the first time period, and wherein the piezoelectric material has a polarization in a first direction and the system further comprises electrodes positioned on the piezoelectric material, the voltage source being configured to apply the first voltage across the electrodes to generate an electric field oriented substantially parallel or antiparallel to the first direction;
   a mass sensor coupled to the piezoelectric material and configured to measure an apparent mass thereof during the first time period;
   a capacitance meter configured to measure a capacitance of the piezoelectric material during the first time period; and,
   a processor coupled to the mass sensor and the capacitance meter, the processor being configured to calculate, based at least in part on the apparent mass and the capacitance measured during the first time period, a first value indicative of a piezoelectric property of the piezoelectric material.

2. The system of claim 1, wherein the processor is configured to calculate the first value based at least in part on: a density of the piezoelectric material; a relative permittivity of the piezoelectric material; and, a thickness of the piezoelectric material.

3. The system of claim 2, wherein:
   the voltage source is configured to:
      apply a bias voltage during an initial time period;
      apply the first voltage during the first time period to generate an electric field oriented substantially parallel to the first direction; and
      apply a second voltage during a second time period to generate an electric field oriented substantially antiparallel to the first direction;
   the mass sensor and the capacitance meter are configured to measure, respectively:
      an initial mass and an initial capacitance during the initial time period;
      a first apparent mass and a first capacitance during the first time period; and
      a second apparent mass and a second capacitance during the second time period; and,
   the processor is configured to calculate the first value based at least in part on the measured initial mass, initial capacitance, first apparent mass, first capacitance, second apparent mass, and second capacitance.

4. The system of claim 1, wherein:

the voltage source is configured to provide a bias voltage to the piezoelectric material during an initial time period;

the mass sensor is configured to measure an initial mass of the piezoelectric material during the initial time period;

the processor is configured to calculate the first value based at least in part on the measured initial mass.

5. The system of claim 1, wherein:

the voltage source is configured to provide a bias voltage to the piezoelectric material during an initial time period;

the capacitance meter is configured to measure an initial capacitance of the piezoelectric material during the initial time period; and the processor is configured to calculate the first value based at least in part on the measured the measured initial capacitance.

6. The system of claim 1, wherein the piezoelectric property includes a piezoelectric coefficient, $d_{33}$, and wherein the processor is configured to calculate the first value based at least in part on the relationship:

$$d_{33} = \frac{\pm\left[\sqrt{\frac{\varepsilon_0 \varepsilon_{rV} m_V}{\rho C_V}} - T\right]}{V}$$

wherein: $m_V$ is the measured apparent mass; $\rho$ is a density of the piezoelectric material; $\varepsilon_{rV}$ is a relative permittivity of the piezoelectric material; V is the magnitude of the first voltage; $C_V$ is the measured capacitance; $\varepsilon_0$ is the permittivity of free space; and T is a thickness of the piezoelectric material.

7. The system of claim 1, wherein the piezoelectric property includes a piezoelectric coefficient, $d_{31}$, calculated based at least in part on the relationship:

$$d_{31} = \frac{1}{E}\left[\mp 1 \pm \sqrt{\sqrt{\frac{C_V m_V}{\varepsilon_0 \varepsilon_{rV} \rho A^2}}}\right]$$

wherein: $m_V$ is the measured effective mass; $m_0$ is a initial mass of the piezoelectric material when there is no voltage applied, $\rho$ is a density of the piezoelectric material; $\varepsilon_{rV}$ is a relative permittivity of the piezoelectric material; E is the magnitude of the electrical field generated by the first voltage, $C_V$ is the measured capacitance; $\varepsilon_0$ is the permittivity of free space; T is a thickness of the piezoelectric material; A is an area of the piezoelectric material.

8. The system of claim 1, wherein the piezoelectric material is part of a piezoelectric component, and wherein the processor is configured to:

compare the calculated first value to a criterion indicative of an operational performance level; and generate an output signal for selecting the piezoelectric component for assembly into a piezoelectric device in response to the first value meeting the criterion.

9. The system of claim 1, wherein the piezoelectric material is part of a piezoelectric actuator, the system further comprising:

a driver configured to generate a drive signal to operate the piezoelectric actuator to perform a primary function; and a transmitter coupled to the processor;

wherein the processor is configured to execute a diagnostic routine comprising instructing the voltage source to apply the first voltage, calculating the first value, and instructing the transmitter to transmit a first signal indicative of the first value.

10. A method comprising:

applying a first voltage across a piezoelectric material during a first time period, wherein the first voltage comprises a voltage waveform having a direct-current (DC) component during the first time period, and wherein the piezoelectric material has a polarization in a first direction and wherein the first voltage is applied across electrodes positioned on the piezoelectric material to generate an electric field oriented substantially parallel or anti-parallel to the first direction;

measuring an apparent mass and a capacitance of the piezoelectric material during the first time period;

calculating, based at least in part on the apparent mass and the capacitance measured during the first time period, a first value indicative of a piezoelectric property of the piezoelectric material.

11. The method of claim 10, wherein the calculation is based at least in part on: a density of the piezoelectric material; a relative permittivity of the piezoelectric material; and, a thickness of the piezoelectric material measured during an initial time period where there a bias voltage is applied to the piezoelectric material.

12. The method of claim 10, wherein the method further comprises measuring an initial mass and an initial capacitance during an initial time period where there a bias voltages is applied to the piezoelectric material and wherein the calculation is further based on the measured initial mass and initial capacitance.

13. The method of claim 10, wherein the piezoelectric material is part of a piezoelectric component, and wherein the method further comprises:

selecting the piezoelectric component for assembly into a piezoelectric device when the first value meets a criterion indicative of an operational performance level; and subjecting the piezoelectric material to a process to modify said electromechanical property when the first value does not meet the criterion indicative of an operational performance level.

14. The method of claim 10, wherein the piezoelectric material is part of a piezoelectric actuator, wherein the method further comprises:

driving the piezoelectric actuator to perform a primary function;

executing a diagnostic routine comprising applying the first voltage and obtaining the first value; and calibrating a drive signal, used for driving the piezoelectric actuator to perform the primary function, based on the obtained first value.

15. A system for determining a piezoelectric property of a piezoelectric material, the system comprising:

means for applying a first voltage across the piezoelectric material during a first time period, wherein the first voltage comprises a voltage waveform having a direct-current (DC) component during the first time period, and wherein the means for applying the first voltage is configured to apply the first voltage across electrodes positioned on the piezoelectric material to generate an electric field oriented substantially parallel or anti-parallel to the first direction;

means for measuring an apparent mass of the piezoelec-tric material during the first time period;

means for measuring a capacitance of the piezoelectric material during the first time period; and, means for calculating, based at least in part on a apparent mass and the capacitance measured during the first time period, a first value indicative of the piezoelectric property.

\* \* \* \* \*